Sept. 22, 1953  V. S. D. BERNARDO  2,652,912
CLUTCH ASSEMBLY
Filed Jan. 31, 1948  3 Sheets-Sheet 1

INVENTOR.
Vicente Sto. D. Bernardo
BY Victor J. Evans & Co.
ATTORNEYS

INVENTOR.
Vicente Sto. D. Bernardo
BY Victor J. Evans & Co.
ATTORNEYS

Patented Sept. 22, 1953

2,652,912

UNITED STATES PATENT OFFICE 2,652,912

CLUTCH ASSEMBLY

Vicente Santo Domingo Bernardo, Manila,
Republic of the Philippines

Application January 31, 1948, Serial No. 5,520

4 Claims. (Cl. 192—68)

The present invention relates to an improved clutch, and more particularly to a clutch for motor vehicles and the like constructed to facilitate easy removal and installation of clutch disks.

One object of the invention is to provide a clutch for motor vehicles and the like in which the worn out clutch disks can be easily and conveniently removed and new clutch disks installed by unskilled labor or by the operator of the vehicle without necessitating removal of the rear running gear assembly or dismantling of the clutch parts.

Another object is to provide a clutch for motor vehicles and the like in which the clutch assembly is provided with a slidable splined shaft capable of being easily displaced longitudinally to permit the clutch disks to be removed for replacement.

Another object is to provide a clutch for motor vehicles and the like in which the clutch housing is constructed such as to permit easy removal of old worn out clutch disks and installation of new disks, without necessitating removal of the clutch housing or disconnecting the same from the motor or transmission units.

Another object is to provide a clutch assembly for motor vehicles and the like in which the driven clutch member is movable to a position to enable the clutch disk to be displaced laterally of the axis of the drive and driven clutch members whereby said clutch disk can be removed for replacement through the upper or lower clutch housing access openings.

Another object is to provide a clutch assembly for motor vehicles and the like in which the clutch casing is provided with a hinged section to enable removal and withdrawal of worn clutch disks as well as replacement of new clutch disks without dismantling any of the clutch casing units or its associated parts.

Another object is to provide a clutch assembly for motor vehicles and the like which is provided with a clutch housing having access openings in its upper and lower peripheral wall to enable the removal and replacement of clutch disks by displacing said splined shaft longitudinally and holding the clutch pedal depressed to displace the driven clutch member a sufficient distance from the clutch drive member and thus permit easy access to the clutch disk.

Another object is to provide a clutch assembly for motor vehicles and the like having a slidable shaft to facilitate insertion and removal of clutch disks, and to provide said shaft with a yielding locking plunger to hold said sliding shaft in its operative position.

Another object is to provide a clutch assembly for motor vehicles and the like for drivingly connecting the motor and transmission units in which said splined shaft is carried by the driven clutch member and has one of its ends slidably and removably received in a bearing in the drive clutch member, whereby said splined shaft can be easily displaced longitudinally to facilitate removal and installation of worn and new clutch disks respectively.

Other objects and advantages of the invention will become apparent during the course of the following description of the accompanying drawings wherein—

Figure 1:
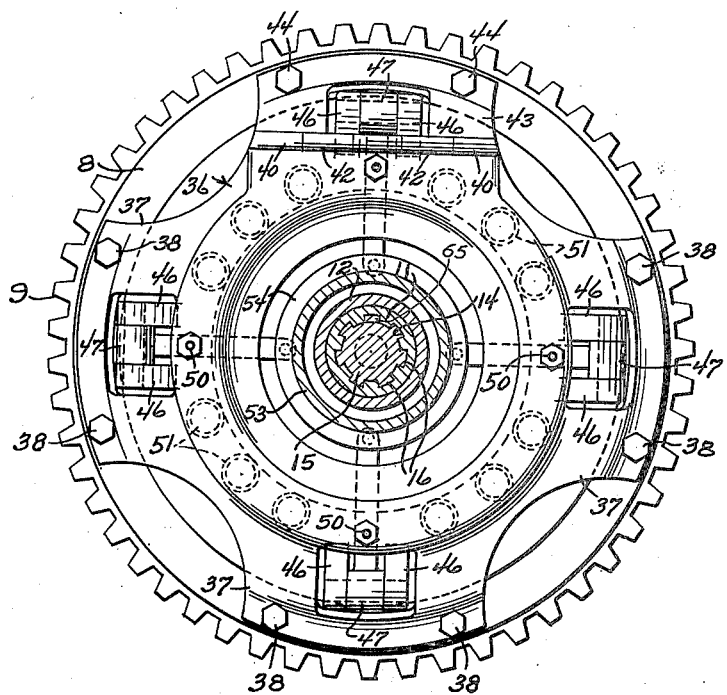
Figure 1 is a transverse cross-sectional view of the clutch assembly taken on line 1—1 of Figure 2 looking in the direction of the arrows and showing the hinged section of the clutch spider casing to facilitate removal of worn clutch disks and replacement of new clutch disks.

In the drawings, and more in detail, there is shown for the purpose of convenience of illustration a clutch housing generally designated 5 which is bolted to a transmission housing 6 likewise generally designated 6. The forward portion of the clutch housing 5 is bolted to the flywheel housing of a conventional motor vehicle engine and the assembly is intended for use in connection with motor vehicles such as automobiles, trucks and similar conveyances where difficulty is encountered in replacing old and worn out clutch disks, and replacing the same with new ones.

Figure 2:
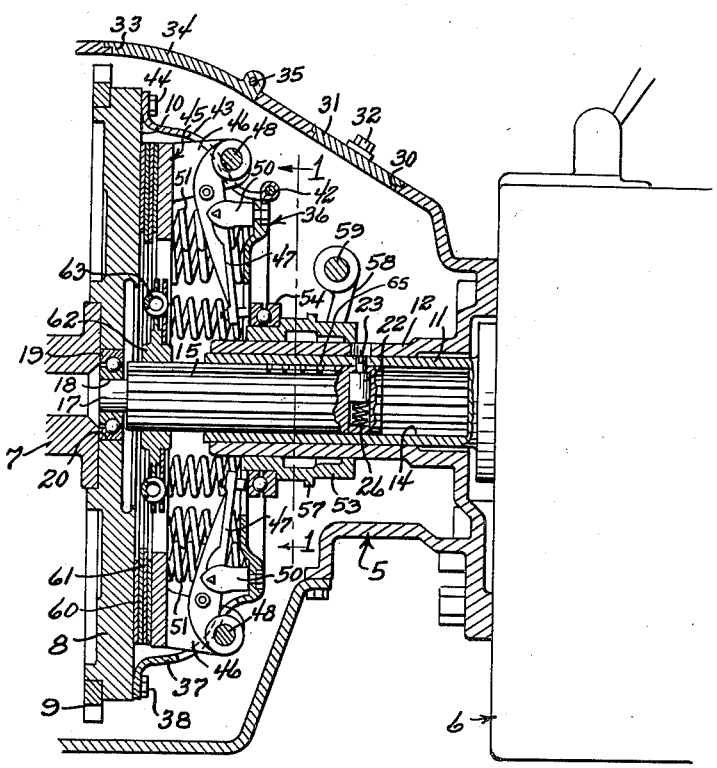
Figure 2 is a vertical cross-sectional view of the clutch assembly showing the clutch housing access openings and illustrating the slidable splined shaft in its operative position.
Figure 3:
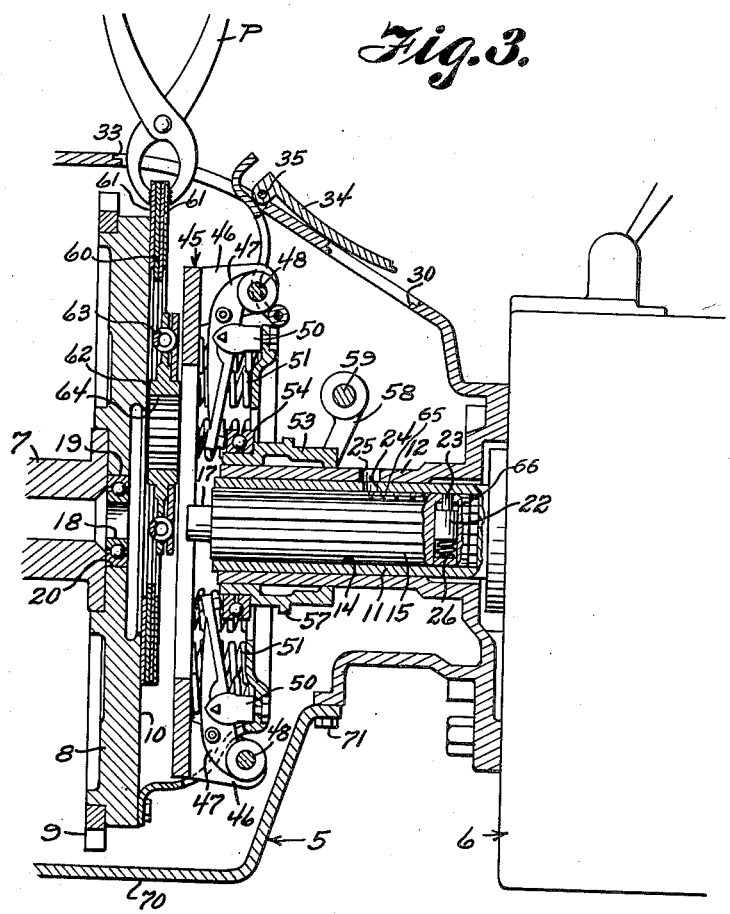
Figure 3 is a vertical cross-sectional view similar to Figure 2, but showing the manner in which the splined shaft is longitudinally displaced for removal and insertion of the clutch disk.
Figure 4:
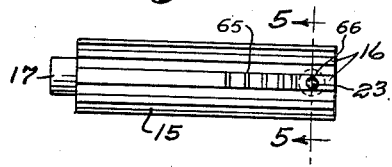
Figure 4 is a side elevational view of the displaceable splined shaft showing the reduced bearing end and the position of the locking plunger therefor and Figure 5 is a transverse cross-sectional view taken on line 5—5 of Figure 4 looking in the direction of the arrows to illustrate various structural details of the locking plunger for holding the splined shaft in its operative position.
Figure 5:
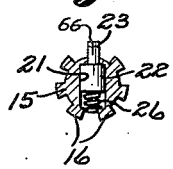

The internal combustion engine (not shown), is provided with the usual power take-off shaft which is connected to a drive shaft 7 having a flywheel 8 and the usual starter ring gear 9. One of the radial faces of the flywheel as at 10 is machined to provide a clutch face in the usual manner. The transmission housing 6 is provided with a driven shaft 11 which projects into the clutch housing 5 and is rotatably supported therein by means of an inwardly extending bearing sleeve 12 integrated with the clutch housing as shown in Figures 2 and 3. The shaft 11 is hollow and is formed with longitudinally extending spline slots 14 (Figure 1). Slidably mounted in the hollow shaft 11 is a splined shaft 15 having radially extending spline ribs 16 (Fig. 5) shaped correspondingly to the spline slots 14 in the hollow shaft 11. One end of the slidable shaft 15 is reduced in diameter as at 17 to form a bearing pin which is adapted to be received in a bearing opening 18 formed in the inner race member of an anti-friction bearing assembly 19 seated within an opening 20 in the drive clutch member 8.

Slidably mounted within a transverse opening 21 adjacent one end of the slide shaft 15 is a spring pressed plunger 22 having a reduced end 23 which is adapted to project radially and be yieldingly urged into locking engagement with an opening 24 in the hollow shaft 11. The bearing sleeve 12 is provided with an opening 25 arranged in alinement with the opening 24 to enable the locking pin 23 to be depressed against the yielding action of the coil spring 26 and thus enable the slidable shaft 15 to be longitudinally displaced. The coil spring 26 has one end arranged in abutting relation with the locking pin 22, while the other end is seated on the bottom wall of the opening 21.

Formed in the clutch housing directly above the opening 25 is an access opening 30 which may be closed by a suitable closure plate 31, held in place by machine screws 32 (Figure 2), and similarly, an access opening 33 is formed in the clutch housing 5 and is arranged above the driven clutch member 8. The access opening 33 is provided with a cover 34 hingedly connected to the casing as at 35.

Attached to the flywheel or driven clutch member 8 is a casing 36 having spider arm 37 which are bolted to the radial wall 10 of the flywheel 8 by machine screws or the like as at 38, and as illustrated in Figure 1, one of the spider arms 37 is cut off and provided with spaced apart hinge eyes or loops 40 which are adapted to cooperate with spaced loops or hinge eyes 42 on a hinged spider arm section 43. The hinged spider arm section 43 is similarly bolted to the flywheel 8 by means of machine screws 44.

Arranged in spaced relation from the clutch face 10 and supported by the clutch casing 36 is a pressure plate 45 which is provided with circumferentially spaced lugs 46 to which one end of the fulcrum levers 47 are pivotally connected by pivot pins 48. The fulcrum levers 47 are pivotally connected to the clutch casing 36 by means of fulcrum pins 50 which are arranged and affixed to the casing 36 in circumferentially spaced apart relation corresponding in position to the lugs 46 of the pressure plate 45.

Coil springs 51 are arranged in circumferentially spaced relation and have one end in abutting relation with the clutch casing 36, while the opposite ends engage the pressure plate 45 to yieldingly urge the same in a direction toward the clutch face 10 of the flywheel or drive clutch member 8.

Slidably mounted on the bearing sleeve 12 is a clutch collar 53 having an anti-friction bearing assembly 54 on one end thereof, and said anti-friction bearing member 54 is of the thrust type and arranged with one of its race members in engagement with the inner free ends 56 of the fulcrum levers 47. The clutch collar 53 is provided with an annular flange 57 which is adapted to be engaged by an inwardly directed pin (not shown), on a clutch operating yoke arm 58 mounted on a control shaft 59. The control shaft 59 is journaled in suitable bearings in the clutch housing and one of the outer ends thereof is operatively connected to the clutch pedal of the motor vehicle (not shown).

The driven clutch member includes a conventional clutch disk 60 carrying friction linings 61, and mounted on a hub 62 through a torque cushioning drive including coil springs 63. The hub 62 is provided with a series of splined slots 64 corresponding in shape to the spline shaft 15 such that the spline shaft 15 may be slidably moved longitudinally into and out of driving engagement with the driven clutch disk 60. When the clutch disk 60 is in position (Figure 2), the yielding spring pressed plunger 22 is urged outwardly so that the end thereof as at 23 will be received in the opening 24 of the tubular shaft 11. Operation of the clutch yoke arm 58 through the medium of the clutch pedal (not shown), will cause the clutch collar 53 to be moved toward the free end of the sleeve bearing 12 and will thus rock the fulcrum levers 47 on the lever fulcrum eye bolt 50 and cause the pressure plate 45 to be moved away from the clutch disk 60 against the yielding action of the coil springs 51, to release or unclutch the drive between the drive shaft 7 and the hollow driven shaft 11. When the clutch pedal (not shown) is released, the coil springs 51 urge the pressure plate 45 into frictional engagement with the clutch disk 60 and also into frictional engagement with the face 10 of the flywheel 8 to clutch the shafts 7 and 11 in driving engagement.

After considerable use, the clutch disk 60 will become worn and the friction lining 61 will no longer establish clutching engagement between the respective drive and driven shafts 7 and 11. When this occurs, it is simply necessary to remove the bolts 32 of the access opening in the cover plate 31 and remove said plate so as to displace the lock plunger 23 from engagement with the opening 24. With the use of a small screw driver through the opening 30 the locking plunger 23 is moved downwardly to the position shown in Figure 2 and by working the screw driver, first in the notch 66, in the end of the plunger and following with the screw driver in the notches 65 in the upper surface of the splined shaft the shaft 15 is withdrawn from the position shown in Figure 2 and moved to the position shown in Figure 3. By manipulating a screw driver or blunt instrument within said opening the splined shaft 15 can be moved to the position shown in Figure 3, wherein the end thereof is displaced from the hub 62 of the clutch disk 60. By then removing the access opening cover 34 by swinging the same rearwardly on its hinge 35 the clutch disk 10 can be grasped by means of a pair of pliers P after the bolts 44 have been removed in the hinged yoke arm 43 (Figure 3). The clutch disk 10 can then be moved upwardly through the access opening 33 and replaced by a new clutch disk by inserting the same through the access opening 33 and positioning the hub thereof to receive the splined shaft 15.

If desired, the lower casing section 70 of the clutch housing 5 can be removed by unloosening the bolts 71 which retain the same in place so as to enable the clutch disk 60 to be removed and replaced through the lower portion of the clutch housing. When removing the clutch disk 60, the clutch pedal (not shown) is depressed to move the pressure plate 45 to the position shown in Figure 3 so that sufficient clearance will be had for the hub 62 of the clutch disk.

It will be readily understood that the structure shown and described can be used for various types of clutches to facilitate replacement of the clutch disk or disks of single and multiple disk-like clutches without materially changing the structure or altering the arrangement of the various parts.

It is to be understood, that various changes in the shape, size and arrangement of parts may be resorted to without departing from the spirit of the invention or the scope of the subjoined claims.

I claim:

1. In a clutch having drive and driven clutch members, a hollow driven shaft having an opening in the wall thereof associated with said driven clutch member, a splined shaft movably mounted in said hollow shaft for longitudinal movement into and out of engagement with the hub of said driven clutch member, a bearing in the drive clutch member for rotatably supporting one end of the splined shaft and a radially disposed spring actuated pin in said splined shaft positioned to register with the opening in the wall of the hollow shaft for retaining the same in its operative position said parts positioned to provide access to the spring actuated pin for manually releasing the drive shaft from the hollow driven shaft.

2. In a clutch, a clutch housing having access openings, a drive shaft extending into said housing, a drive clutch member affixed to said shaft, a hollow driven shaft likewise extending into said housing in axial alinement with said drive shaft, a driven clutch disk adapted to cooperate with said drive clutch member, a splined shaft slidably mounted in said hollow driven shaft adapted to slide into and out of a correspondingly shaped opening in said driven clutch disk, a pressure plate carried by said drive clutch member adapted to yieldingly urge said clutch disk into frictional engagement with said drive clutch member, a spider having radially disposed arms providing a housing for the clutch parts and positioned over the end of the said hollow driven shaft, means hinging an arm of the spider to provide access to the driven clutch disc, means bolting the ends of the spider arms to the drive clutch member and a lock carried by said shaft to hold said shaft in its operative position, one of said access openings being positioned to permit operation of said lock to release said splined shaft from operative engagement with said driven clutch disk and the other of said access openings being arranged to permit removal and replacement of said clutch disk after the splined shaft has been longitudinally displaced from engagement with said driven clutch disk.

3. In a clutch, a clutch housing having access openings, a drive shaft in said housing, a drive clutch member on said shaft, a casing attached to said drive clutch member having a hinged cover section removably attached to said drive clutch member, a hollow driven shaft projecting into said clutch housing and through said casing, a splined shaft slidably mounted in said driven shaft, a driven clutch disk having its hub removably mounted on said splined shaft, a yieldingly pressed locking plunger carried by said splined shaft to lock said shaft to said hollow driven shaft, a pressure plate mounted in said clutch casing adapted to engage said driven clutch disk, lever mechanism connected to said casing, means engageable with said lever mechanism for releasing said clutch plate, yielding coil springs mounted between said casing and pressure plate to urge the same in frictional engagement with said driven clutch disk and a clutch collar supported by said casing engageable with said lever mechanism to move said pressure plate away from said drive clutch member when said clutch collar is moved in a predetermined direction to unclutch the drive and driven shafts.

4. In a clutch, a clutch housing having access openings, a drive shaft extending into said housing, a clutch flywheel on said drive shaft having a radial face to provide a clutch surface, a hollow driven shaft projecting into said housing in alinement with said drive shaft, a splined shaft slidably mounted in said hollow driven shaft, a lock carried by said shaft to lock the same to said hollow driven shaft, a bearing in the clutch flywheel for removably receiving the other end of said slidable shaft, a casing affixed to said clutch flywheel having an access opening, a hinged cover for said access opening, a driven clutch disk having its hub positioned for receiving the slidable shaft, a pressure plate associated with said clutch mechanism, lever mechanism for controlling said clutch plate and means for controlling said lever mechanism, said slidable shaft being adapted to be retracted to facilitate removal of the driven clutch member through the access openings in the clutch casing and clutch housing.

VICENTE STO. D. BERNARDO.

References Cited in the file of this patent

UNITED STATES PATENTS

| Number | Name | Date |
|---|---|---|
| 1,305,029 | Tibbetts | May 27, 1919 |
| 1,821,127 | Vandeveer | Sept. 1, 1931 |
| 1,900,305 | Shoenrock | Mar. 7, 1933 |
| 1,910,084 | Bixby | May 23, 1933 |
| 2,201,567 | Walters | May 21, 1940 |
| 2,403,322 | Acton | July 2, 1946 |